July 20, 1937. J. HOLLST 2,087,434

HORSE COLLAR

Filed Sept. 28, 1936

Inventor

Joe Hollst

By Arthur H. Sturges

Attorney

Patented July 20, 1937

2,087,434

UNITED STATES PATENT OFFICE 2,087,434

HORSE COLLAR

Joe Hollst, Yutan, Nebr.

Application September 28, 1936, Serial No. 102,904

1 Claim. (Cl. 54—19)

This invention relates to harness for draft animals and more particularly to collars for horses and oxen and has for an object to provide a collar of two piece construction which may be readily operated for facilitating removal and placement of harness and the collar on a horse, particularly a balky animal such as is sensitive to or resentful of placing a collar over its head during training of the animal to wear harness for work purposes, said collar also being adapted to fit several sizes of horse necks and to provide means whereby the traces of the harness which are connected to a horse collar may be positioned by means of the present invention with respect to the horse's shoulder so that the light strain of draft training may come upon a selected portion of the shoulders or adjacent thereto at selected periods of said training, said strain being shifted to other portions at other periods thereof. Also in instances where a horse has a sore skin adjacent his shoulders, the collar of the present invention provides means for positioning the draft so that the strain will come on other than said sore place.

A still further object of the invention is to provide a collar of two piece construction which may be interchangeably used upon horses, oxen, etc., in instances when the latter have elongated horns which prevent placing a conventional collar past said horns and onto the neck of the animal, the collar of the present invention being susceptible of placement in a work position without passing the collar over such ox's head.

Other and further objects and advantages of the invention will be apparent from the following detailed description thereof, reference being had to the accompanying drawing in which.

Figure 1:
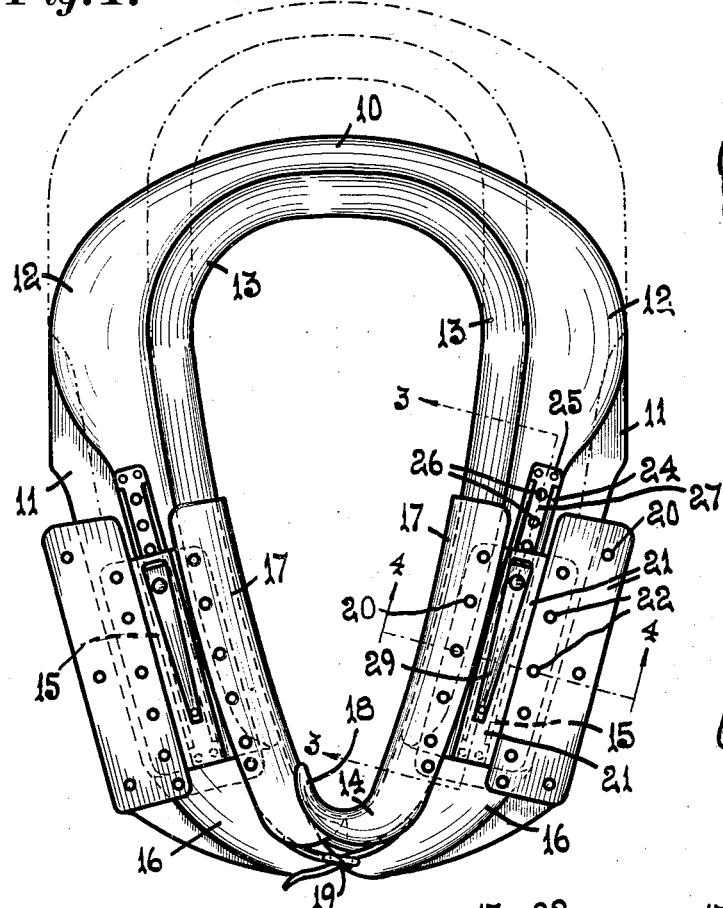
Figure 1 is a front elevational view of a collar embodying the present invention.
Figure 2:
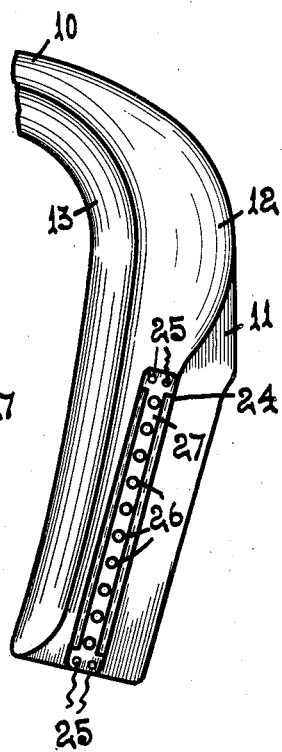
Figure 2 is a front elevational view of a fragment of a half portion of the collar.

Referring now to the drawing, the collar of the present invention includes a member 10 which is of substantially U-shape in plan having oppositely disposed legs 11 which converge towards each other outwardly of the main body portion of the member 10, said member being provided with padded portions 12 and provided with a curved loop 13 at the inner edge thereof adapted to abut the shoulders of a work animal.

Figure 4:
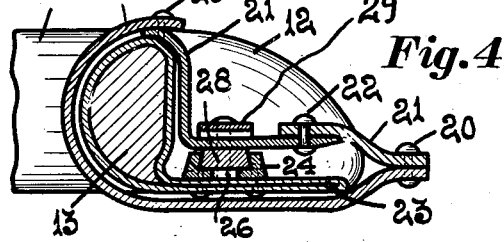
Figure 4 is a transverse sectional view taken on line 4—4 of Figure 1.

A member 14 of substantially V-shape in elevation having oppositely disposed legs 15 which diverge outwardly with respect to each other from the main body portion thereof are also provided with padded portions 16 and having inner edges which are arcuate in cross section as best shown in Figure 4 and adapted to abut the neck of said animal. The legs 15 may be rigid with respect to the main body portion or the latter may be made separably in two-half portions, one of said portions having a tang 18 adapted to overlie the adjacent half portion, said portions being held together by means of a buckle and strap indicated at 19, this construction being of particular advantage in connection with oxen having comparatively thick necks.

As best shown in Figure 4, the ends of the legs 15 are formed hollow and thereby arranged to each slidingly receive therein a leg 11 of the U-member 10 for positioning the members 10 and 14 together about the neck of said animal and as shown in Figure 4 the curved leather end portion of each leg 17 is riveted as at 20 adjacent the side edges thereof to an elongated metallic member 21, the latter being formed of an integral piece or of two piece construction as shown, in which case the two pieces are riveted together as indicated at 22 in Figure 4 whereby the members 21 maintain the outer ends of each leg 15 open for the reception therein of a leg 11 of the member 10.

The outer ends of the legs 11 of the member 10 are provided with flanges 23 extending outwardly from their padded portions, the latter being encased with leather, said leather also providing the flanges 23.

The flanges 23 are each provided with an elongated reinforcing plate 24 suitably secured thereto by means of rivets 25 or the like, said plates having a plurality of longitudinally positioned apertures and a longitudinally extending slot, the side walls of which converge toward each other from the bottom thereof toward their open tops.

The apertures 26 of the plates 24 are formed through the bottom wall of the slots, the latter being each adapted to receive an elongated strip 28. The strips are secured by any suitable means to the metallic members 21, said strips having complemental divergent side walls adapted to be received between and abut against the convergent side walls of the slots and to cooperate therewith for maintaining respective legs of the U and V members rigidly aligned about the neck of said animal during use of the device.

Figure 3:
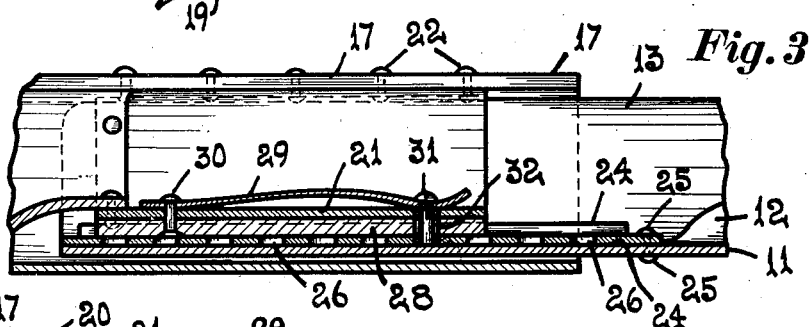
Figure 3 is a sectional view taken on line 3—3 of Figure 1.

As best shown in Figures 1 and 3, at an outer end of each metallic member 21 an elongated resilient member or spring 29 is secured by any suitable means such as the rivets 30, the opposite end of the springs 29 being each provided with a detent 31 which extends through holes 32 provided through the members 21, said detents being normally urged by their springs toward and each received in an aperture 26 of a respective plate for maintaining legs of said V members secured to respective legs of said U-member, whereby said members are removably attached together in an operative position.

The traces of the harness may be secured adjacent the pads 12 of the U-shaped member 10 by any suitable conventional means, not shown.

It is obvious that various changes and modifications may be made in the details of construction and design of the above specifically described embodiment of this invention without departing from the spirit thereof, such changes and modifications being restricted only by the scope of the invention as claimed.

What is claimed is:

A draft collar for a work animal comprising a member of substantially U-shape having legs disposed convergent toward each other and provided with padded portions having a curved loop at the inner edge thereof adapted to abut the shoulders of said animal, a member of substantially V-shape having legs disposed divergent with respect to each other and provided with padded portions having arcuate inner edges adapted to abut the neck of said animal, each leg of said U member arranged to be slidingly received in a leg of said V member for positioning said members together about said neck, and means for removably attaching said members operatively together, said means comprising an elongated reinforcing plate secured to each leg of said U member, said plates provided with apertures and having longitudinally extending slots the side walls of which converge toward each other from the bottom to the open top of said slots, each leg of said V member provided with an elongated strip secured thereto, said strips having complemental divergent side walls adapted to cooperate with and be received between the walls of said slots for maintaining respective legs of said V and U members aligned about said neck, each leg of said V member provided with a resilient detent adapted to be urged toward and received in an aperture of a plate for maintaining legs of said V member secured to respective legs of said U member.

JOE HOLLST.